Oct. 28, 1969   E. C. FREY   3,474,937
FLUENT MATERIAL DISPENSER WITH AGITATOR AND PLURAL
DISCHARGE ASSISTANTS
Filed Jan. 3, 1968
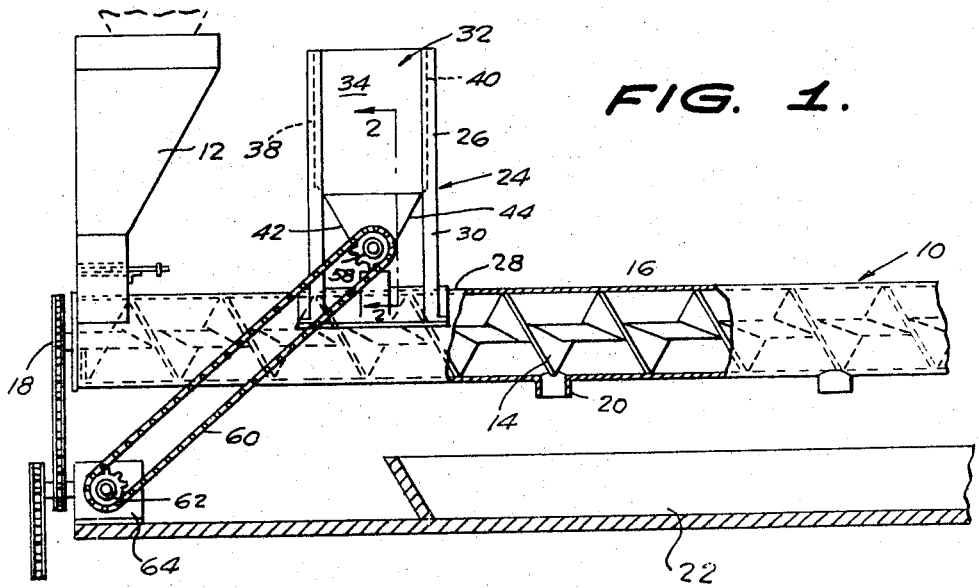
FIG. 1.
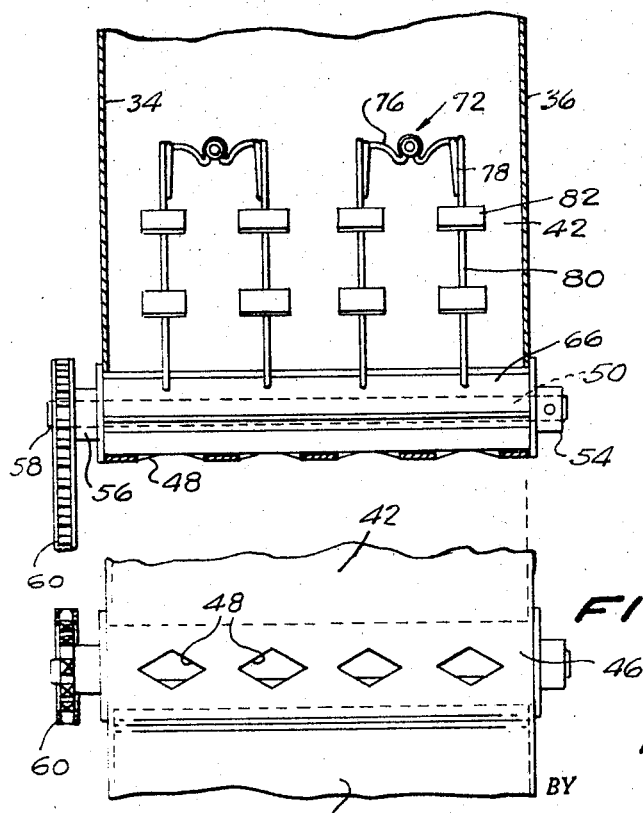
FIG. 2.
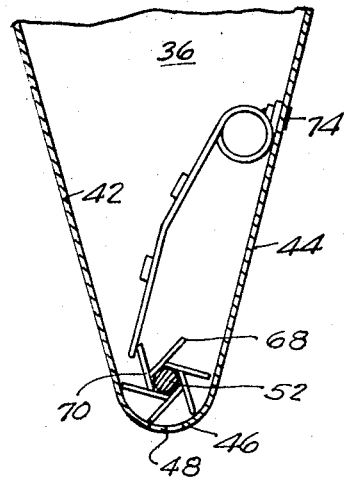
FIG. 3.
FIG. 4.
INVENTOR.
EDWARD C. FREY,
BY
Robert G. McMorrow.
ATTORNEY.

United States Patent Office 3,474,937
Patented Oct. 28, 1969

3,474,937
FLUENT MATERIAL DISPENSER WITH AGITATOR AND PLURAL DISCHARGE ASSISTANTS
Edward C. Frey, Cohocton, N.Y., assignor to International Stock Food Corporation, Waverly, N.Y., a corporation of New York
Filed Jan. 3, 1968, Ser. No. 695,483
Int. Cl. G01f *11/00, 11/20, 13/00*
U.S. Cl. 222—227                             1 Claim

ABSTRACT OF THE DISCLOSURE

A dispenser for flowable materials, wherein a hopper has a rounded lower end section with a rotatable shaft extending thereacross, the shaft having non-radial blades and spring means serially contacting the blades upon rotation.

BACKGROUND OF THE INVENTION

Field of the invention

This invention relates to dispensers for the continous issuance of flowable materials.

Statement of the prior art

It has been heretofore proposed to dispense granulated, pulverized and similar materials by the combination of a hopper with bottom discharge outlet means, and rotating agitator blades. Examples of United States patents in this area of interest include the following Patents Nos. 2,710,117, Fritz et al., June 7, 1955; 2,796,-202, Lawrence, June 18, 1957; 3,114,481, West, Dec. 17, 1963; 3,164,305; Stevens, Jan. 5, 1965; Re. 26,275, Stevens, Oct. 3, 1967.

These previously known devices, while entirely effective in the distribution of coarsely granulated materials, have encountered problems in the even distribution of powdered material of low flowability.

SUMMARY OF THE INVENTION

This invention comprehends an improved distribution means for the metered flow of finely granulated or powdered materials. More particularly, the present apparatus is advantageous in the application of additives to other substances. An example of this, for which this apparatus was specifically developed, is found in the addition of a food grade preservative compound comprising a mixture of powdered sodium sulfate and malt diastase (as covered in United States Patent No. 3,184,314, dated May 18, 1965) to ensilage, grain, and the like. The preservative is ideally applied to the ensilage or the like in connection with a conveying operation. To meet this objective, the present device involves a flow apparatus correlated to a conveyor, whereby the preservative is added to the conveyed material at a rate which is a function of the conveyor speed.

A basic objective of this invention, in connection with the general objects stated above, is to provide a continuous flow distribution system for the addition of powdered material to conveyed substances. A related structural objective resides in the provision of a new and novel arrangement of impellor blades, coupled with coil spring agitation means which assure a constant and adequate flow of the material to be dispensed. This positioning and orientation of the impellor blades provides a "snow plow" action in the device and produces a pressurized source of material over the apparatus outlet means.

Other and further objects and advantages of the invention will become apparent to those skilled in the art from consideration of the following specification when read in conjunction with the annexed drawing.

BRIEF DESCRIPTION OF THE DRAWING

FIGURE 1 is an assembly view showing a conveying system with apparatus constructed and assembled in accordance with the teachings of this invention in place thereon;

FIGURE 2 is an enlarged sectional view of the apparatus, taken substantially on the section line 2—2 of FIGURE 1, looking in the direction of the arrows;

FIGURE 3 is a medial cross-sectional view thereof; and

FIGURE 4 is a fragmentary bottom plan view of the apparatus.

DESCRIPTION OF THE PREFERRED EMBODIMENT

Referring to the drawing in more detail, an auger type conveying assembly 10 is shown in FIGURE 1 and includes a main hopper 12 conveying a supply of grain, ensilage or other material to a bin or discharge location. The conveyor element 14 of the assembly may be of any suitable type normally employed in such devices, such as a belt, continuous screw, or the like, and is housed in a frame 16 of any suitable type. The conveyor is driven by chain 18 connected to a remote power source not shown in the drawing. It is emphasized that this environment of the invention is described by way of example only, and that any conveying system may be employed in lieu thereof. In the illustrated example, the transported material is discharged from the conveyor at spaced orifices 20 into a discharge container 22.

The apparatus of this invention comprises mounting means 24 in the form of a supporting element 26 secured to the frame 16 of the conveyor over an opening 28 therein such that the apparatus overlies the moving mass of material in the conveyor. The support means 24 includes a plurality of spaced legs 30 which hold the substantially rectangular hopper 32 therebetween.

The hopper 32 has a container with vertical side walls 34, 36, forward and rear walls 38, 40 and converging bottom walls 42, 44. The bottom walls are integrally joined together by a connecting, rounded web portion 46. The web portion 46 has a plurality of diamond-shaped discharge openings 48 formed therein at its lower extremity, the openings being arranged in a horizontally aligned row transverse of the path of movement of the material to be treated.

Axle means 50 of this invention comprise a cylindrical cross-shaft 52 with bearings 54, 56 at its ends. The shaft extends transversely between the vertical side walls 34 and 36 and has a sprocket 58 on one end with a drive chain 60 extending to a second sprocket 62 connected to a gearbox 64 driven by the main conveyor drive means and at a speed controlled by the speed of the conveyor.

Secured to the axle shaft 52 are a plurality of elongated, substantially rectangular blades 66. The blades 66 each have an outer edge 68 and an inner edge 70, and the blades are fixed to the shaft 52 in non-radial, tangential positions inclined rearwardly from the direction of rotation of the shaft. It will be seen in the drawing that the inner edges 70 contact the next succeeding blade intermediate its edges, whereby as the shaft 52 rotates, the blades define generally triangular areas and serve to gather material from the hopper within the said areas and to move the material over the discharge openings 48 in a measured volume.

Secured to the bottom wall 44 at locations spaced upwardly from the web portion 46 are a plurality of spring means 72. Each assembly 72 comprises a central connector ring 74 affixed by a rivet or the like to the wall and side elements 76 extend outwardly from each connector ring. Coil portions 78 are integrally joined to the lateral side portions and terminate in depending, elongated prongs 80 which extend to a depth such that they serially contact the blades 66 upon rotation. In order to increase the resistance of the prongs and thereby magnify the amplitude of thrust for each blade 66 upon release from the spring, the blades have a plurality of block members 82 fixed thereon at vertically spaced positions.

In operation, as material in a constantly moving mass is passed under the dispensing apparatus in the conveyor 16, the shaft 52 is rotated, resulting in a constant dispensing of material from the hopper 32 into the conveyed material.

Having described and illustrated an embodiment of this invention in some detail, it will be understood that this description and illustration are offered only by way of example, and that the invention is to be limited in scope only by the appended claim.

I claim:
1. In a mixing apparatus having a main conveyor supplying a flow of material from a source of supply, said main conveyer being driven by a power source, a dispenser for a pulverized substance to be added to the material, the dispenser being mounted over the flow of material and comprising:
 a hopper for the substance, including side walls and inclined bottom walls, the bottom walls being joined by a rounded web;
 the web having a series of discharge openings therein arranged over the flow of material;
 axle means comprising an axle extending rotatably between the side walls over said series of openings;
 a series of tangentially arranged blades fixed to the axle, each blade having an inner edge and an outer edge;
 the blade inner edges being in contact with the next adjacent blade intermediate the edges thereof, and the blade outer edges sequentially contacting the web during a portion of each rotation of the axle, whereby the web and successive blades entrap a measured quantity of material therebetween and move said material over the openings for uniform discharge;
 the axle being driven by the power source of said main conveyer, whereby the rate of rotation of the axle is controlled by the rate of movement of the main conveyer;
 a series of spring assembles, each comprising a central connector ring secured to one of the bottom walls and having side extensions, coils at said extensions and depending prongs which extend in depth to a location whereat they serially contact the blades upon rotation, permitting said rotation in one direction only and releasing the blades from contact; and
 each of said prongs having a plurality of blocks thereon to magnify the amplitude of thrust of the prongs.

References Cited

UNITED STATES PATENTS

| | | | |
|---|---|---|---|
| 30,516 | 10/1860 | Ballantine | 222—231 |
| 742,591 | 10/1903 | Clark | 222—413 X |
| 1,226,108 | 5/1917 | Olney | 222—368 X |
| 1,727,320 | 9/1929 | Wolfe | 222—231 |
| 2,161,553 | 6/1939 | Westberg et al. | 222—368 X |
| 2,454,662 | 11/1948 | Marsh | 222—413 X |
| 2,530,181 | 11/1950 | Schilling | 222—368 X |
| 2,723,053 | 11/1955 | Grandrud | 222—177 |

SAMUEL F. COLEMAN, Primary Examiner

U.S. Cl. X.R.

222—231, 368, 413